Jan. 6, 1953 J. N. SCHROCK ET AL 2,624,538
AUTOMATIC LOT WEIGHING MACHINE
Filed Feb. 23, 1950 2 SHEETS—SHEET 1
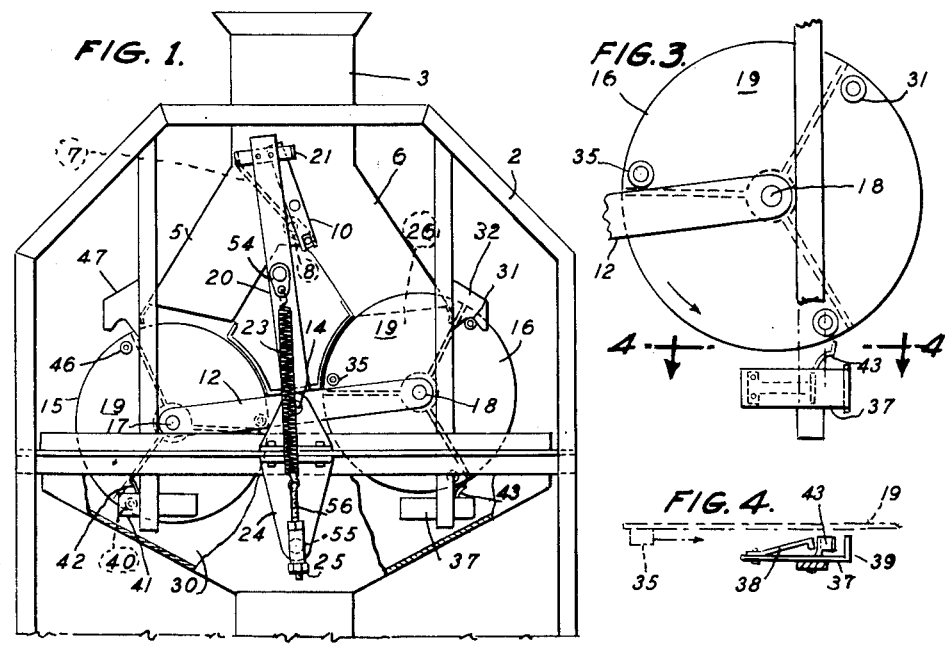
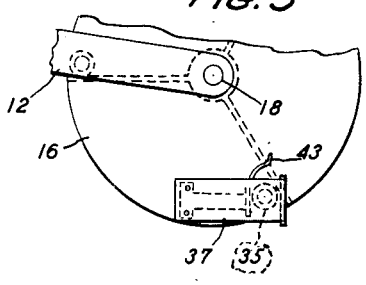
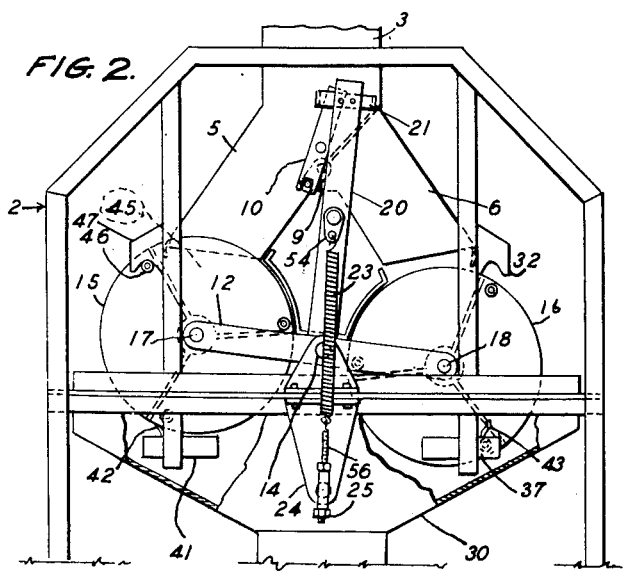
INVENTORS
JACOB N. SCHROCK
CLYDE E. WATSON
HAROLD WATSON
BY Scott L. Norvill
ATTORNEY

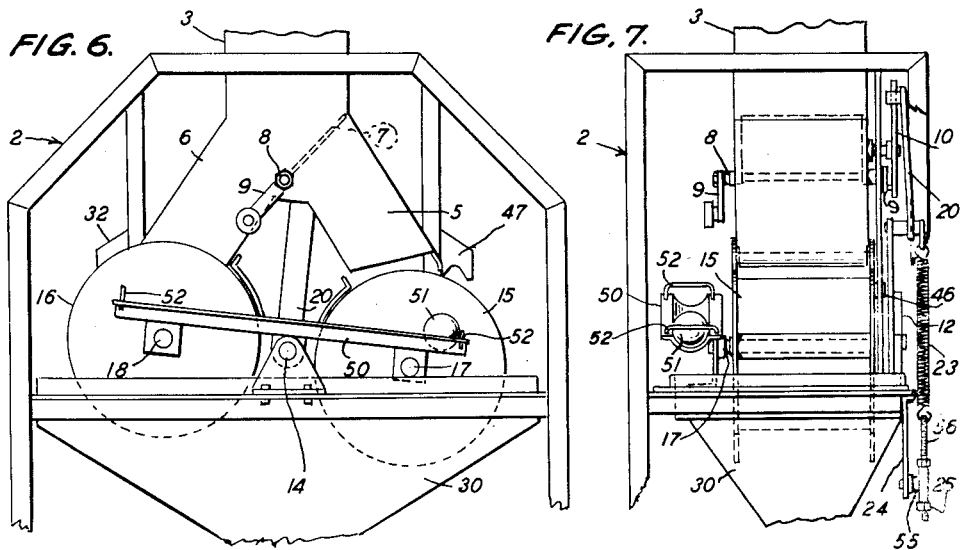
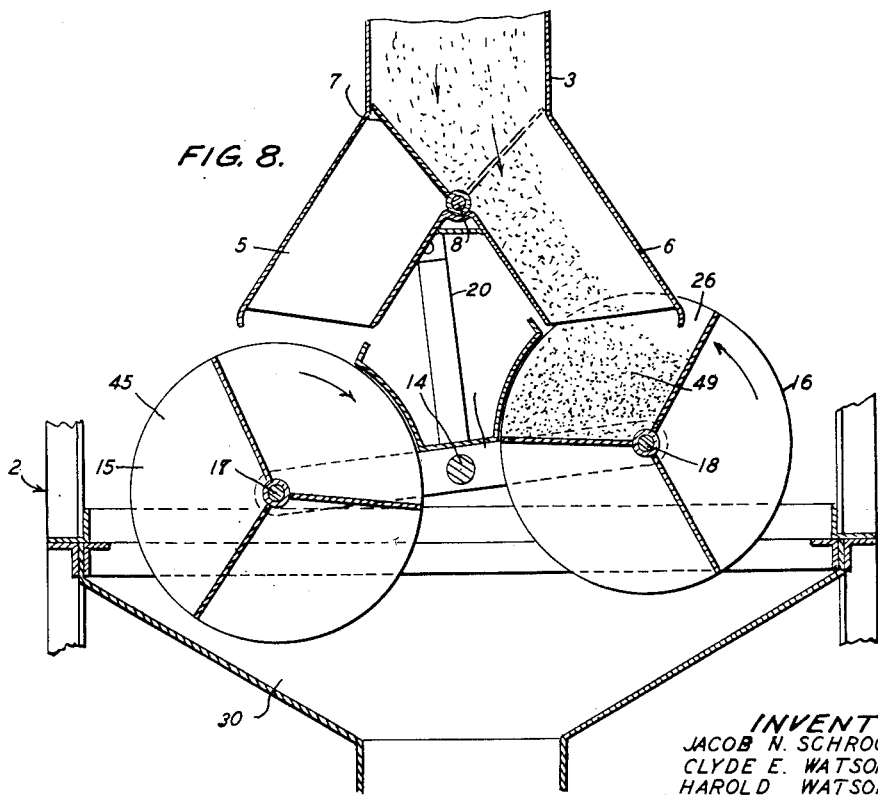

Patented Jan. 6, 1953

2,624,538

UNITED STATES PATENT OFFICE 2,624,538

AUTOMATIC LOT WEIGHING MACHINE

Jacob N. Schrock, Clyde E. Watson, and Harold Watson, Phoenix, Ariz.; said Harold Watson assignor to Fred Irion, Maricopa County, Ariz.

Application February 23, 1950, Serial No. 145,712

3 Claims. (Cl. 249—12)

This invention pertains to lot weighing machines.

One of the objects of the machine is to provide a mechanism for weighing predetermined uniform lots or quantities of loose materials, and delivering them successively to a delivery chute whereby they may be packed into containers;

Another object is to provide means for receiving, weighing, and delivering accurate uniform lots of loose materials, such as dried beans, potato chips or the like, in rotatable compartments which will deposit the weighed lot into a delivery chute, and rotate to a charging position ready to receive another charge;

Another object includes the provision of means for adjusting the weighed amounts.

Still another object concerns the provision for fine adjustment of the weighed lots;

We attain the foregoing objects by means of the devices and mechanism shown in the accompanying drawings, in which, Figure 1 is a front view of the weighing mechanism with the front plate of the enclosing case removed;

Figure 2 is a similar view of the mechanism, but with the weighing beam mechanism tilted at opposite extreme of its travel;

Figure 3 is a fragmentary view, showing one of the receiving bins and attending mechanism drawn on an enlarged scale;

Figure 4 is a portion thereof as viewed from line 4—4, Figure 3;

Figure 5 is a fragmentary portion of the righthand weighing bin shown in Figure 2, drawn on an enlarged scale;

Figure 6 is an elevational view of the back side of the weighing mechanism;

Figure 7 is a side view thereof; and

Figure 8 is a semi-diagrammatical elevational view with the parts shown in transverse section.

Similar numerals refer to similar parts in the several views.

Within frame 2 a receiving hopper 3 is positioned at the top. This divides and is formed into two delivery chutes 5 and 6. A pivoted gate valve 7 operates between the upper ends of these chutes, hinging on shaft 8. This has a crank 9 which is operated by lever 10.

Below chutes 5 and 6, and within the front portion of frame 2, is balance beam 12 which is centrally attached to the forward end portion of balance shaft 14. Trough shaped beam 50 is similarly attached to the rear end portion of balance shaft 14. The ends of shaft 14 are journalled in the front and rear to portions of frame 2, and both beams tilt together as they balance within frame 2. Rotary weighing wheels 15 and 16 are rotatably supported at each of the respective ends of said beams on shafts 17 and 18, respectively. The front ends of these shafts are journalled in balance beam 12, and the rear ends in trough shaped beam 50. (See Figure 7.) These weighing wheels are each divided into three equally sized, substantially sector shaped, receiving compartments, such as 26, Figure 1, which are arranged annularly around their shafts. The ends of these weighing wheels are composed of disks 19.

In the center of beam 12 a gate operating arm 20 extends upward at right angles. On the upper end of this arm is a horizontal double trip piece 21, which engages opposite side edges of the upper end of lever 10 alternately.

A spring 23 is attached at about the middle of the length of arm 20, and is held at its lower end on a plate 24 directly below the center of beam shaft 14. Tension of this spring is adjusted by nut 25 threaded on rod 56. It will be seen that, in either position, right or left, spring 23 has moved beyond dead center, and tends to maintain the beam in either of said tilted positions, respectively.

In Figure 1 the right rotary weighing wheel 16 is in raised position receiving a "lot" or "charge" load. This is being deposited in the upper left compartment 26. The other wheel, 15, has discharged into discharge hopper 30.

Wheel 16 is held from rotation by ball bearing boss 31 on disk 19 engaging against stop 32. When the required weight of materials is received in hopper 26, wheel 16 drops away from chute 6 freeing boss 31 from 32, so that wheel 16 rotates counterclockwise until roller bearing boss 35 engages bottom stop 37 (Figures 2 and 5).

Obviously, there are both top and bottom stops for each weighing wheel. The bottom stops have spring latches 38 which keep bosses 35 from rebounding out of the stop after striking the detaining lip 39.

While weighing wheel 16 is filling, wheel 15 is discharging, and is held in position by bearing boss 40 engaged in bottom stop 41. When wheel 15 leaves this lower or discharging position, bearing boss 40 engages guide 42, which rotates wheel 15 clockwise ⅓ of a complete rotation, whereupon it is stopped at its next filling position by bearing boss 46 engaging stop 47 (Figure 2). Its compartment 45 is then in position to receive material from chute 5. It is to be understood that wheels 15 and 16 are successively presented to chutes 5 and 6, respectively, by the tilting action of beam 12. As each of the wheels is lowered and again raised to the chute above it, the wheel is rotated so that a wheel compartment, following the one dumped on the downward movement, is presented to said chute following said upward movement.

The operation continues alternately so long as material to be weighed is fed into receiving hopper 3. When wheel 16 moves down, the weight of material in compartment 26 causes it to rotate counterclockwise to dumping position, and its received "lot" of material 49 is deposited in discharge hopper 30. When wheel 15 moves up the guide 42 causes it to rotate clockwise. Guide 43 on stop 37 operates similarly on wheel 16 to give it counterclockwise motion.

Hopper 3 is fed with material to be weighed into lots continuously by a conveyor belt (not shown) or other desired means.

As beam 12 tilts from side to side, arm 20 operates lever 10, and this, in turn, operates valve 7 which switches the feed from chutes 6 to 5 and vice versa.

At the rear of shaft 14 and at the rear side of the weighing beam assembly, of which beam 12 is at the front, as above stated there is a trough shaped beam 50 which is attached to and supports the rear ends of shafts 17 and 18, and bears likewise on shaft 14. A weight gauging ball 51 rolls in this trough shaped beam from end to end and against end stops 52. Since this ball remains at the low end of the trough shaped beam, its weight must be counterbalanced by material in the receiving compartment of the higher weighing wheel. This ball constitutes the means for coarse adjustment of the weight of "lots" of the material to be weighed.

It is to be noted that spring 23 also tends to maintain the balance beam assembly, including beams 12 and 50, in either of its two tilted positions. The urge of this spring must be overcome, together with the weight of ball 51, by material filling the compartment on the raised weighing wheel. Since the tension of spring 23 can be very accurately adjusted by nut 25, this part of the device is known as the fine adjustment of the weights of the lots.

From the foregoing it is apparent that as material is fed through hopper 3, it will be diverted to either of chutes 5 or 6 by the action of gate valve 7. The position of gate valve is controlled by weighing beam 12, motion being communicated to the gate valve by mechanism including levers 20 and 10 and crank 9. The action of these levers with reference to their shafts may be considered a motion reversing mechanism. That is, when weighing wheel 16 is up, raised to feed receiving position, lever 10 is tilted to the left at its top, crank 9 to the right and valve 7 to the left. Trip piece 21 having already contacted the top of lever 10 is free to move to the right and does not meet with resistance until wheel 16 is filled and started downward. Trip piece does not contact the left side of lever 10 until the whole beam assembly or structure has acquired considerable inertia in its tilting motion, clockwise on its bearing shaft 14.

As wheel 16 pulls away from the lower end of chute 6, the load in the filled compartment causes it to rotate counterclockwise, as above mentioned. As the wheel descends boss 31 leaves stop 32 and thus the wheel is free to rotate. The boss 35, next adjacent to the left is then stopped by stop 37 where it is held between lip 39 and the end of tongue spring 38. At the same time the one-third rotation discharges the contents of compartment 26 into lower hopper 30. When wheel 16 raises again, boss 35 is moved upward out of and away from stop 37 and is given rotary motion counterclockwise in the same direction which the load in the compartment moved it as it descended from the raised filling position contacting chute 6.

The same action takes place relative to wheel 15 and its attendant parts on the left side of the entire device, equivalent parts being conversely arranged.

It is to be understood that when wheel 16 is in raised or filling position, it is maintained in such position by ball 51 which is at the left end of trough shaped beam 50 and also by spring 23 which is stretched between mounting tab 54 on lever 20 above tilt shaft 14, and its swivel mount 55 on frame bracket 24 directly below shaft 14, and is alined to the left of the axis of shaft 14. The load received in wheel compartment 26 must overcome the weight of ball 51, as the coarse adjustment and the leftwise pull of spring 23 before wheel 16 can descend and deposit the load in hopper 30. When it does descend, and beam 12 tilts to the right, ball 51 rolls to the right, spring 23 moves to the right of the axis of shaft 14, and valve 7 is swung to the right so as to divert material entering hopper 3 into lefthand chute 5.

Charges or lots received by either wheel are, therefore, accurately weighed and intermittently discharged into discharge hopper 30 from which they may be directed into cartons, bags or other desired receptacles.

Since the various parts, illustrated and described, are subject to wide variation as to form, size, material and function, we wish to be limited only by the claims.

We claim:

1. In a lot weighing mechanism having a tiltable weighing beam structure with lot receiving wheels at each end tiltably pivoted in a frame; means for gauging amounts to be weighed, as received by said wheels, including a trough shaped beam paralleling and attached to said weighing beam having stops at each end, a ball of predetermined weight positioned in said trough and arranged to roll from end to end in said trough according to the tilt of said beam, an arm extending upward at right angles from the center of said weighing beam, a spring attached at its upper end to the upper central portion of said arm and at its lower end to a portion of said frame directly below the axis of said pivot, and screw means operative between the lower end of said spring and said frame for adjusting the tension of said spring.

2. In a lot weighing machine having a tiltable weighing beam with rotary lot receiving wheels with disk shaped end plates at each end, tiltably mounted in a frame, means for charging said lot receiving wheels alternately, including a hopper, an inverted Y chute therebeneath, and a gate valve tiltably mounted at the throat of said Y chute, disposed to shut off one arm of said chute and leave the other open when tilted to the limit of its motion in either direction; means for detaining said wheels alternately in charge receiving position and discharging position including radially positioned bosses on one end plate of each of said wheels, and upper stops on said frame positioned to engage one of said bosses when either wheel is raised to receiving position and provided with a notch to receive and detain it from rotation, and to release it for rotation when it descends to discharging position, together with lower stops on said frame having retaining lips disposed to engage said wheel bosses when said wheels are lowered to discharging position and spring latches positioned to detain said wheel from rotation while in discharging position, and guides on said lower stops disposed to slidably engage said wheel bosses as said wheels move upward from discharging position to thereby rotate them to load receiving position.

3. In a lot weighing machine having a frame, a hopper at the top thereof, inverted Y shaped chutes leading therefrom, a gate valve hinged at the apex of the Y of said chutes and positioned to divert flow of material from said hopper to either of said chutes when tilted from side to side, a weighing beam tiltably mounted in said frame below said chutes having rotating lot receiving wheels mounted at each end disposed to receive material from the chutes above it when in raised position, and after receiving a predetermined weight of material, to move to a lowered discharging position: the combination therewith of mechanism for swinging said gate valve so that material from said hopper is directed into the arm of said Y chute above the lot receiving wheel which is in raised position, including a gate operating arm extending upward at right angles from the center of said weighing beam, a double trip plate at the upper end of this arm positioned to engage either side of a gate operative lever, a hinge shaft on said gate having an outwardly extending crank, and a gate operating lever pivotally supported on said frame and disposed to transmit motion to and fro, from said gate operating arm to the crank on said hinge shaft; said parts being arranged so that when said weighing beam is tilted to raise one of said lot receiving wheels to lot receiving position said trip plate does not contact said gate operating lever, and when said lot receiving wheel moves downward, tilting said weighing beam accordingly, said trip plate engages said gate operating lever and moves it so that said gate valve is swung on its hinge shaft to a position to divert the flow of material from said hopper to the opposite arm of said Y chute.

JACOB N. SCHROCK.
CLYDE E. WATSON.
HAROLD WATSON.

REFERENCES CITED

The following references are of record in the file of this patent:

UNITED STATES PATENTS

| Number | Name | Date |
|---|---|---|
| 397,628 | Brunton | Feb. 12, 1889 |
| 494,035 | Simons | Mar. 21, 1893 |
| 559,680 | Collins | May 5, 1896 |
| 648,877 | McLeod | May 1, 1900 |
| 692,609 | Brough | Feb. 4, 1902 |
| 2,056,900 | Holm | Oct. 6, 1936 |